Jan. 23, 1951   J. G. BATTAGLIA   2,539,222
VARIABLE LIFT AIRFOIL
Filed June 16, 1949   2 Sheets-Sheet 2
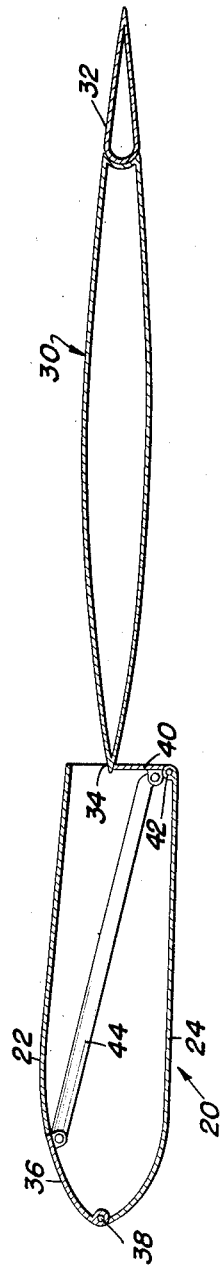
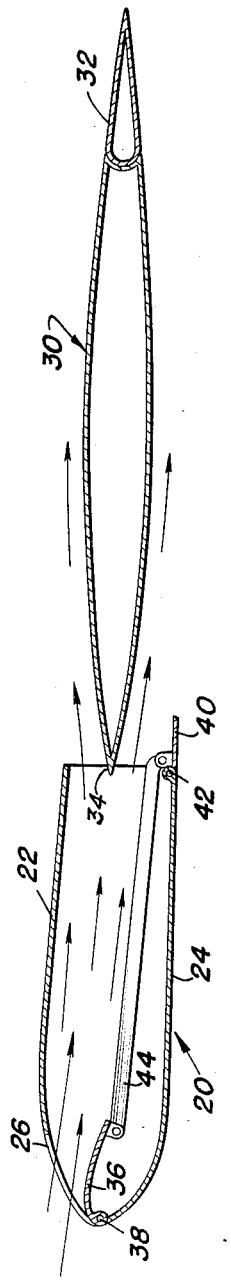
Inventor
James G. Battaglia
By Clarence A. O'Brien
and Harvey B. Jacobson
Attorneys Patented Jan. 23, 1951

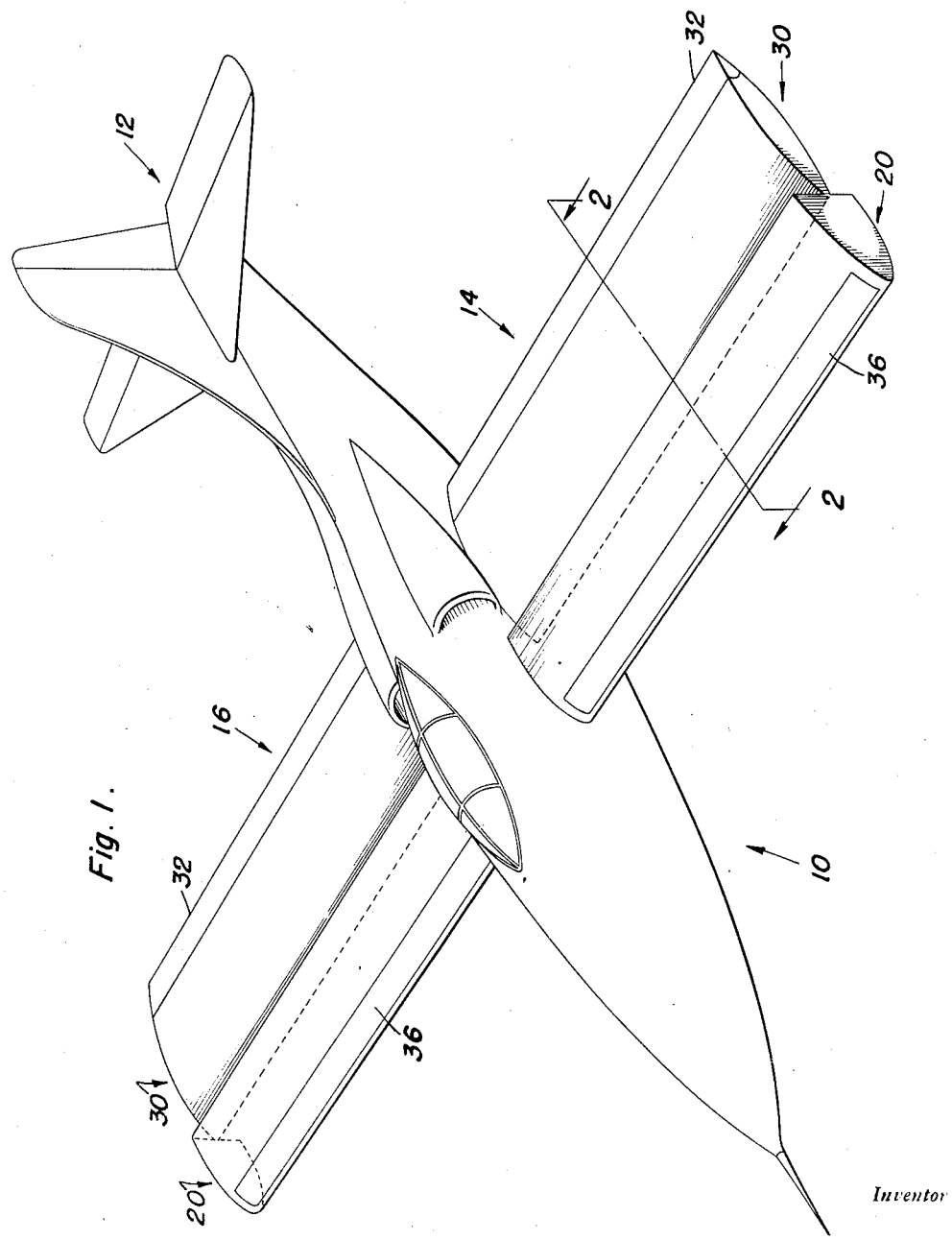

2,539,222

UNITED STATES PATENT OFFICE 2,539,222

VARIABLE LIFT AIRFOIL

James G. Battaglia, San Pedro, Calif., assignor of fifty per cent to Jack David, San Pedro, Calif.

Application June 16, 1949, Serial No. 99,528

4 Claims. (Cl. 244—40)

This invention relates to novel and useful improvements in airfoils. An object of this invention is to provide a wing section with an opening in the leading edge and at the top thereof for passage of air therethrough and to provide a rear section for the said wing section of a substantially symmetrical airfoil construction in itself and to position a single valve at the front part of the rear symmetrical airfoil section which is located at the rear part of the leading edge section so as to regulate the passage of air below the symmetrical trailing edge member.

Another object of this invention is to provide an improved airfoil for use in connection with aircraft depending on wings for lift in sustained flight and take-off, which consists of a leading edge member extending rearwardly a distance of approximately thirty-five per cent of the chord of the wing section, the remainder of the wing section consisting of a trailing edge member of substantially symmetrical airfoil shape and to regulate the passage of air through the leading edge member by a valve and simultaneously regulate the passage of air which has passed through the leading edge member, preventing all of it from flowing over the top part of the trailing edge member.

Ancillary objects and features will become apparent to those skilled in the art, in following the description of the preferred form of the invention, illustrated in the accompanying drawings, wherein:

Figure 1 is a perspective view of a typical aircraft having the improved airfoil incorporated therewith and used thereon;

Figure 2 is a sectional view taken on the line 2—2 of Figure 1 and in the direction of the arrows; and Figure 3 is a sectional view similar to that shown in Figure 1, showing the valves in the open position and indicating diagrammatically only the flow through the leading edge member and over the trailing edge member.

The aircraft, generally indicated at 10, is provided with the usual empennage generally indicated at 12, together with the other appurtenances contiguous to an operative aircraft including wing sections 14 and 16, respectively, which are of identical construction.

The so-called high speed aircraft is conducive of airflow over the wing peculiar to supersonic and approaching sonic speeds. It is found that very high speed airflow over a conventional shaped airfoil, such as a Clark Y, or a symmetrical airfoil or any of the commonly used NACA shapes, breaks down behind the center of lift at very high speeds.

Various ways and means have been resorted to to modify the airflow over the wing, such as slots formed in the wings. The present invention teaches the use of a special wing construction to tend to retain the flow over the upper surface of the airfoil and under the lower surface of the airfoil smooth. The tendency is to retain the stream lines at very high speeds approaching and over sonic somewhat similar to the stream lines at low speeds.

In accomplishing this result, there is provided a leading edge member 20 of substantially conventional shape. The leading edge member has an upper camber member or element 22 and a lower camber element or member 24 in its makeup with an opening 26 at the front part of the upper camber member. The leading edge member extends rearwardly a distance substantially equal to thirty-five per cent of the chord of the wing section. By test data, this length of leading edge member has been found conducive of best results.

A trailing edge member, generally indicated at 30, is disposed behind the leading edge member and is of airfoil shape. As shown in Figures 2 and 3, the trailing edge member is of symmetrical airfoil shape and has an aileron 32 at the rear thereof. The front end 34 of the trailing edge member is disposed intermediate the upper camber member 22 and the lower camber member 24 and in the open back of said leading edge member.

A valve 36 is pivoted by means of a suitable hinge 38 in the opening 26 and is smoothly curved to form a continuation of the interrupted contour of the upper camber member. A second valve 40 is pivoted by means of a conventional hinge 42 to the rear edge of the lower camber member 24. The valve 40 is of sufficient height to close the opening formed between the front 34 of the trailing edge member and the rear end of the lower camber member 24.

Means connecting the valve 36 and the valve 40 for synchronous movement is disposed between the valves and within the leading edge member. This means consists preferably of a simple pitman 44 pivoted at its ends to respective valves. Any suitable means, hydraulically operated or mechanically operated, may be used for actuation of the two valves.

In operation, when high speeds are attained, the opening 26 is opened by operation of the valve 36 together with the valve 40, allowing smooth flow over the trailing edge member which serves in the nature of an auxiliary airfoil and which tends to render the flow over the entire airfoil smooth.

Having described the invention, what is claimed as new is:

1. A wing section for an aircraft comprising a leading edge member having an upper and a lower camber member, and a trailing edge member disposed behind said leading edge member, said leading edge member extending rearwardly a distance substantially equal to thirty-five per cent of the chord of the wing section and having an open back, said trailing edge member being airfoil shaped with its front edge being disposed intermediate the vertical space between the upper and lower camber members, said upper and lower camber members being so arranged that their respective adjacent edges define a frontal opening in the leading edge member, a valve mounted upon the leading edge member and operable to close the opening in said leading edge member, and a second valve mounted upon said leading edge member and operable to close the opening defined by the lower camber member and the front edge of the trailing edge member.

2. A wing section for an aircraft comprising a leading edge member having an upper and a lower camber member, and a trailing edge member disposed behind said leading edge member, said leading edge member extending rearwardly a distance substantially equal to thirty-five per cent of the chord of the wing section and having an open back, said trailing edge member being airfoil shaped with its front edge being disposed intermediate the vertical space between the upper and lower camber members, said upper and lower camber members being so arranged that their respective adjacent edges define a frontal opening in the leading edge member, a valve mounted upon the leading edge member and operable to close the opening in said leading edge member, a second valve mounted upon said leading edge member and operable to close the opening defined by the lower camber member and the front edge of the trailing edge member, and means operatively connected with said valves for synchronizing the movement of said valves.

3. In an aircraft, a wing section comprising a leading edge member, said leading edge member comprising an upper camber element and a lower camber element, said elements having spaced rear edges and forward edges, said forward edges being located adjacent to each other and being so arranged that said adjacent forward edges define a frontal opening in said leading edge member, a valve mounted upon said leading edge member and operable to close the frontal opening in said leading edge member, an airfoil shaped trailing edge member disposed behind said leading edge member and having a front part disposed intermediate the rear edges of said upper and lower camber elements, and a second valve arranged to close the opening defined by the lower camber element and the front part of the trailing edge member.

4. In an aircraft, a wing section comprising a leading edge member which includes an upper camber element and a lower camber element, said elements having forward edges located adjacent to each other and said elements being so arranged that said forward edges define a frontal opening, a valve mounted upon the leading edge member and operable to close said frontal opening, and a substantially symmetrical airfoil shaped trailing edge member disposed behind said leading edge member and having a front part disposed intermediate the space between the rear portions of the leading edge member lower and upper camber elements, the maximum camber of the wing section being in the leading edge member, and a second valve mounted upon said leading edge member and operable to close the opening defined by said lower camber element and the front part of the trailing edge member.

JAMES G. BATTAGLIA.

REFERENCES CITED

The following references are of record in the file of this patent:

UNITED STATES PATENTS

| Number | Name | Date |
|---|---|---|
| 1,915,481 | Ziegler | June 27, 1933 |
| 1,962,390 | Gerdes | June 12, 1934 |
| 1,979,184 | Ziegler | Oct. 30, 1934 |
| 2,041,793 | Stalker | May 26, 1936 |